(12) United States Patent
Fuchs et al.

(10) Patent No.: US 6,711,779 B1
(45) Date of Patent: Mar. 30, 2004

(54) HINGE JOINT FOR EYEGLASSES

(75) Inventors: Gerhard Fuchs, Pasching (AT); Rupert Spindelbalker, Puchenau (AT)

(73) Assignee: Silhouette International Schmied AG, Linz (AT)

( * ) Notice: Subject to any disclaimer, the term of this patent is extended or adjusted under 35 U.S.C. 154(b) by 0 days.

(21) Appl. No.: 10/069,808

(22) PCT Filed: Sep. 22, 2000

(86) PCT No.: PCT/AT00/00254

§ 371 (c)(1), (2), (4) Date: Feb. 25, 2002

(87) PCT Pub. No.: WO01/23944

PCT Pub. Date: May 4, 2001

(30) Foreign Application Priority Data

Sep. 24, 1999 (AT) .................................. 1631/99
Jul. 11, 2000 (AT) .................................. 1185/2000

(51) Int. Cl.$^7$ .................................................. G02C 5/22
(52) U.S. Cl. ........................................ 16/228; 16/356
(58) Field of Search ........................... 16/228, 319, 330, 16/337, 355, 356, 362, 363, 364

(56) References Cited

U.S. PATENT DOCUMENTS

| 2,288,657 | A | * | 7/1942 | Splaine | 351/113 |
| 3,396,426 | A | * | 8/1968 | Ziolko | 452/92 |
| 3,427,681 | A | * | 2/1969 | Smith, Jr. | 16/228 |
| 4,666,328 | A | * | 5/1987 | Ryu | 403/92 |
| 4,951,349 | A | * | 8/1990 | Dietrich et al. | 16/228 |
| 5,599,056 | A | * | 2/1997 | Schmitt | 296/122 |
| 5,764,337 | A | * | 6/1998 | Petignat | 351/153 |

FOREIGN PATENT DOCUMENTS

| EP | 0 814 360 | 12/1997 |
| EP | 0 838 711 | 4/1998 |
| GB | 2 281 979 | 3/1995 |
| GB | 2 753 283 | 3/1998 |
| WO | WO 99 14628 | 3/1999 |

* cited by examiner

Primary Examiner—Lynne H. Browne
Assistant Examiner—Mark Williams
(74) Attorney, Agent, or Firm—Collard & Roe, P.C.

(57) ABSTRACT

A hinge for spectacles comprising a joint body (5) used as a hinge axle, which body forms a coaxial circumferential groove (7) for receiving an eye (9) of a side jaw (8) and is rotationally rigidly held between two legs (4) of an end (2) of a side, which legs are mutually connected at least at one end and extend on either side of the circumferential groove (7). In order to provide advantageous constructional conditions it is proposed that the joint body (5) consists of two preferably disk-like parts (6) whose abutting surfaces (s) extend transversally to the hinge axle in the zone of the circumferential groove (7).

5 Claims, 3 Drawing Sheets

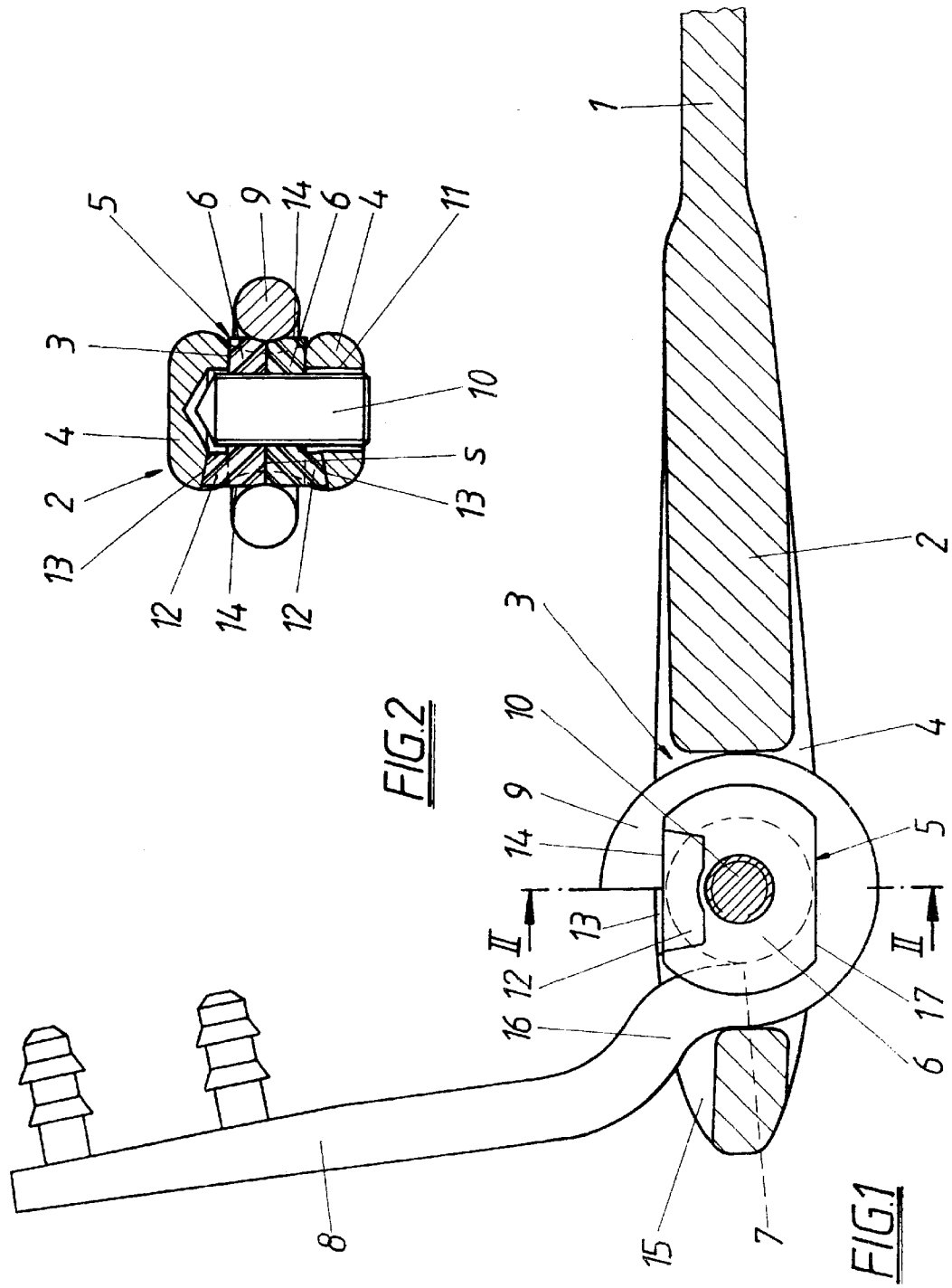

HINGE JOINT FOR EYEGLASSES

Applicants claim priority under 35 U.S.C. §119 of Austrian Application No. A 1631/99, filed on Sep. 24, 1999, and Austrian Application No. A 1185/2000, filed on Jul. 11, 2000. Applicants also claim priority under 35 U.S.C. §365 of PCT/AT00/00254, filed on Sep. 22, 2000. The international application under PCT article 21(2) was not published in English.

BACKGROUND OF THE INVENTION

The invention relates to a hinge for spectacles with a joint body used as a hinge axle, which body forms a coaxial circumferential groove for receiving an eye of a side jaw and is rotationally rigidly held between two legs of an end of a side, which legs are mutually connected at least at one end and extend on either side of the circumferential groove.

DESCRIPTION OF THE PRIOR ART

In known hinges of this type (WO 99/14628 A1), the two legs of the U-shaped bent end of the side penetrate the preferably spherical joint body on either side of the circumferential groove, with the connecting bridge between the two legs of the end of the side externally overlapping the wire eye of the side jaw, which wire eye is guided in the circumferential groove of the joint body and is open on the circumferential side. As a result of these measures, the joint body is held in a rotationally rigid manner between the legs of the U-shaped bent end of the side whose connecting bridge which overlaps the wire eye externally additionally makes any inadvertent unlatching of the wire eye from the circumferential groove of the joint body more difficult. The precondition for such a design is, however, that the wire eye of the side jaw is provided with sufficient flexural elasticity in order to allow the same to resiliently latch into the circumferential groove of the joint body by widening. If such elasticity properties cannot be ensured, which is the case for example in wire eyes made of a gold alloy or eyes which are closed off on the circumferential side, this otherwise advantageous design cannot be used.

Similar disadvantages are obtained in another known design (GB 2 281 979 A) in which the joint body of the hinge which is encompassed by the wire eye is not spherical but is configured in the form of a disk which can be associated with the side or the jaw of the side. The wire eye which is formed by the jaw or the side must again be widened accordingly in order to allow latching into the circumferential groove of the disk-like joint body, which again requires a sufficient flexural elasticity of the wire eye.

SUMMARY OF THE INVENTION

The invention is thus based on the object of configuring a hinge for spectacles of the kind mentioned above in such a way that wire eyes which are open on the circumferential side with a limited flexural elasticity or eyes which are closed off on the circumferential side can be used without having to take into account any complex mounting conditions.

This object is achieved by the invention in such a way that the joint body consists of two preferably disk-like parts whose abutting surfaces extend transversally to the hinge axis in the zone of the circumferential groove.

By dividing the joint body into two parts along a dividing surface extending transversally to the hinge axis in the zone of the circumferential groove, it is no longer necessary to accordingly widen the eye of the side jaw, because the two parts of the joint body can be inserted from opposite sides into the eye of the side jaw in the direction of the hinge axis. The eye can therefore be provided with an open and also closed arrangement on the circumferential side. In order to mount the joint body with the eye of the side jaw held between its parts, the joint body merely needs to be inserted between the two legs and its parts be connected in a rotationally rigid manner with the legs of the end of the side. The rotationally rigid fixing of the joint body constitutes an advantageous precondition to determine the running of the hinge by the friction between the eye and the joint body.

For this purpose the parts of the joint body can be provided at their mutually averted face sides with parallel receiving grooves for the two legs of the end of the side. In order to enable the insertion of such a joint body between the legs of the end of the side, the legs can be widened within the scope of their own elasticity, so that the eye with the inserted joint body can be inserted transversally to the legs. In the case of legs which are mutually connected at only one end, it is potentially also possible to insert the joint body from the open side of the legs in their longitudinal direction. No separate tools are necessary in both cases for mounting.

Various measures can be taken so as to prevent any inadvertent displacement of the joint body along the legs. Caulking or gluing between the legs and the joint body would be a possibility for example. Particularly simple constructional conditions are obtained, however, when the joint body can be latched into a latching recess of at least one leg, so that the joint body merely needs to be displaced along the legs into the latching recess in order to be held resiliently in said latching recess against any further displacement. This solution not only offers the advantage of a toolless assembly, but also that of a simple detachability Since for inserting the joint body between the legs it is necessary to align the two parts of the joint body with respect to one another in such a way that the receiving grooves extend parallel on their mutually averted face sides, measures are recommended which secure this alignment during the introduction of the two parts of the joint body into the eye of the side jaw from opposite sides. For this purpose the two parts of the joint body can mutually engage with graded abutting surfaces which allow the axial joining of the two parts only in the intended alignment of the receiving grooves.

Another possibility to join the parts of the joint body with the legs of the end of the side is obtained in such a way that the legs of the end of the side are jointly mutually connected to form a receiving eye in which the joint body is held by a pin penetrating the same and that the two parts of the joint body are supported with respect to the receiving eye in a rotationally rigid way by way of rotational stops which engage in the latching recesses of the receiving eye and project axially beyond the joint body. In order to mount the joint body with the wire eye held between its parts, the joint body is introduced into the receiving eye formed by the end of the side and held in said receiving eye by a pin which penetrates the joint body in the direction of the hinge axis and engages with its ends which project on either side from the hinge body into bores of the legs of the end of the side. Since the two parts of the joint body are supported in a rotationally rigid way with respect to the end of the side by way of rotational stops engaging in latching recesses of the receiving eye, the running hinge is again determined by the friction between the wire eye and the joint body.

In order to dismount the hinge the joint body must be detached from the receiving eye of the end of the side, which requires a removal of the pin penetrating the joint body. This can be achieved in a simple manner in such a way that the pin is provided with a threaded section. A threaded pin screwed into the end of the side requires a respective female thread in the end piece, which not only increases the production work, but also leads to difficulties in the case of breakage of the threaded bolt. For this reason the pin provided with a self-cutting thread can merely be screwed into the joint body, so that it is held in the end of the side in a freely rotating way with the pin ends projecting on either side beyond the joint body. This measure allows omitting the cutting of a female thread. As a result of the inherent elasticity of the plastic of the joint body it is possible to ensure a secure holding of the pin in the joint body beyond the threaded section. The unscrewing of the pin from the joint body is simple, so that advantageous constructional conditions can be brought about. They are based on the fact that the parts of the joint body can be supported in a rotationally rigid way in the end of the side by way of the rotational stops, so that no torques caused by the actuation of the hinge are exerted on the pins.

BRIEF DESCRIPTION OF THE DRAWINGS

The subject matter of the invention is shown by way of example in the drawings, wherein:

FIG. 1 shows a hinge in accordance with the invention in a simplified view perpendicular to the hinge axis;

FIG. 2 shows a sectional view along line II—II of FIG. 1;

DETAILED DESCRIPTION OF THE PREFERRED EMBODIMENTS

Figure 3:
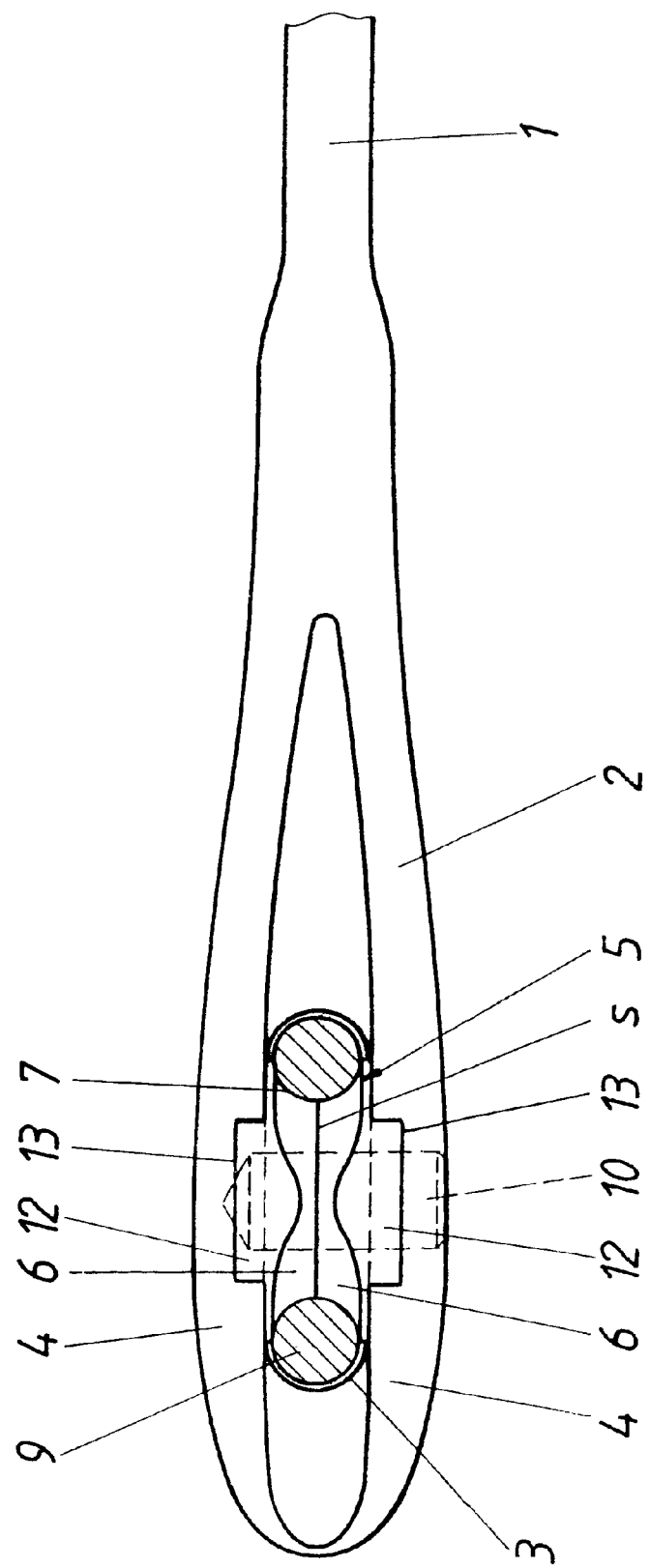
FIG. 3 shows the hinge according to FIG. 1 in a partly elevated view perpendicular to the hinge axis.

According to the embodiment according to FIGS. 1 to 3, the side 1 made of wire is provided with an end 2 which is widened into a receiving eye 3. A disk-like joint body 5 is inserted in the receiving eye 3 which is formed by two legs 4 which are mutually connected at the two ends 2, which joint body 5 consists of two parts 6 which between themselves form a circumferential groove 7. The abutting surfaces s between the two parts 6 extend symmetrically with respect to the circumferential groove 7 and perpendicular to its axis, as is shown especially in FIG. 3.

The side jaw 8 of a spectacle frame (not shown in closer detail) forms at its hinge end a wire eye 9 which is open on the circumferential side and engages in the circumferential groove 7 of the joint body 5. FIG. 1 shows that the wire eye 9 envelops the circumferential groove 7 at an angle of approx. 270°, which excludes any insertion of the wire eye 9 into the circumferential groove 7 of the joint body 5 perpendicular to the axis of the circumferential groove 7 if the wire eye 9 is to enclose the joint body 5 in the circumferential groove 7 in a resilient way in order to achieve a respective run of the hinge. For this reason the parts 6 of the joint body 5 are introduced from mutually opposite sides in the axial direction into the wire eye 9, with the wire eye 9 being widened slightly in a resilient manner. The wire eye 9 which engages in the circumferential groove 7 of the joint body 5 is then inserted with the joint body 5 into the receiving eye 3 of the end 2 of the side and fixed therein with the help of a pin 10 which penetrates the joint body 5 and engages with its ends, which project axially beyond the joint body 5, in the leg-sided sections of a pocket-hole bore 11 which is provided in the legs 4 of the end 2 of the side. The arrangement is such that the pin 10 merely penetrates with a self-cutting thread the bearing body 5 in a positive locking manner. It is guided in a freely rotatable manner in the pocket-hole bore 11, however, as is indicated by the play between the pin 10 and the pocket-hole bore 11.

In order to prevent any simultaneous rotation of the joint body 5 with the wire eye 9 during the swiveling of the side 1 with respect to the side jaw 8, the parts 6 of the joint body 5 are provided with rotational stops 12 which project axially against the closely fitting legs 4 of the receiving eye 3 and engage during the insertion of the joint body 5 into the receiving eye 3 into respective latching recesses 13 of the legs 4 and connect the joint body 5 with the end 2 of the side in a rotationally rigid way.

In order to mount the hinge it is only necessary to insert the wire eye 9 with the joint body 5 into the receiving eye 3 after the insertion of the parts 6 on the wire eye 9 and to fix the same with a self-cutting threaded pin 10 in the end 2 of the side, with the pin 10 only penetrating the joint body 5 in a thread-cutting manner. The hinge can be disassembled in a similar way, because for this purpose it is merely necessary to unscrew the pin 10 from the joint body 5.

Figure 4:
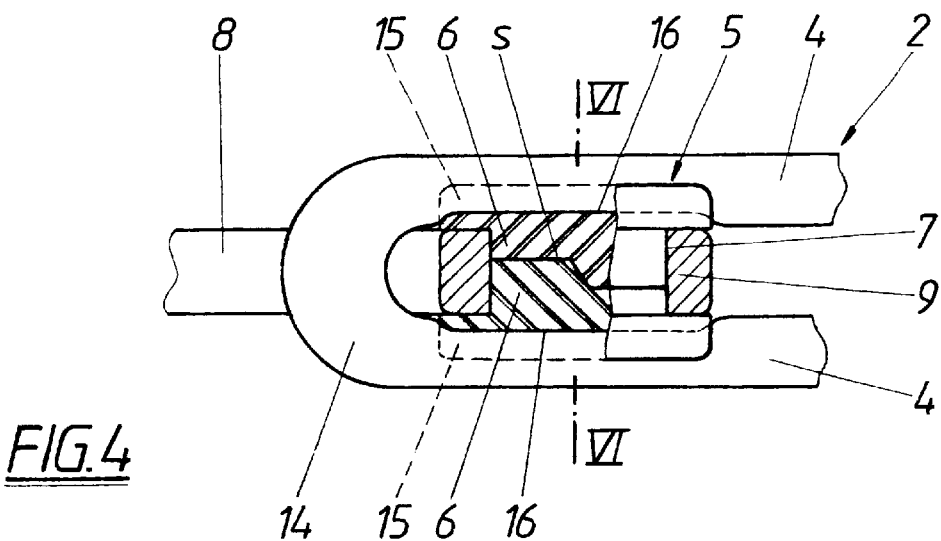
FIG. 4 shows an embodiment of a hinge in accordance with the invention in a partial sectional view through the hinge axis.
Figure 5:
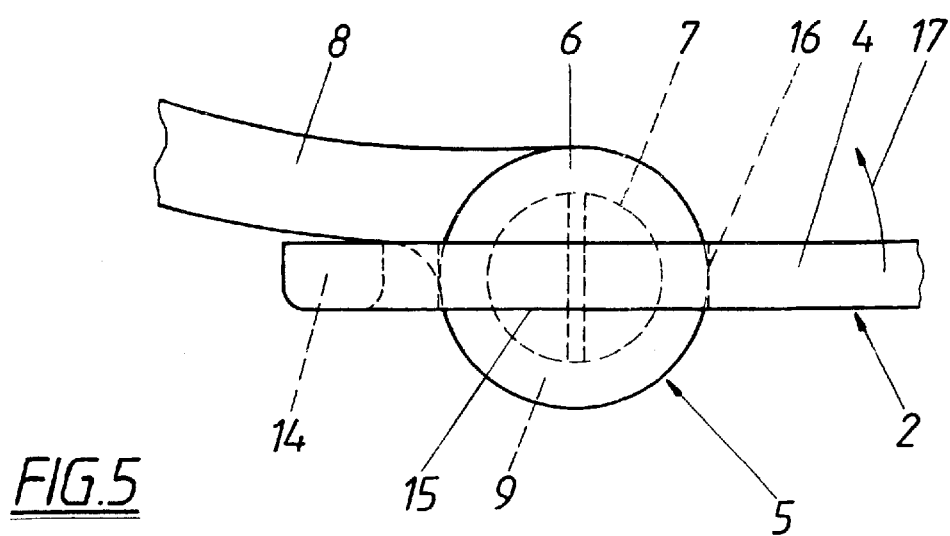
FIG. 5 shows this hinge in a top view in the direction of the hinge axis.
Figure 6:
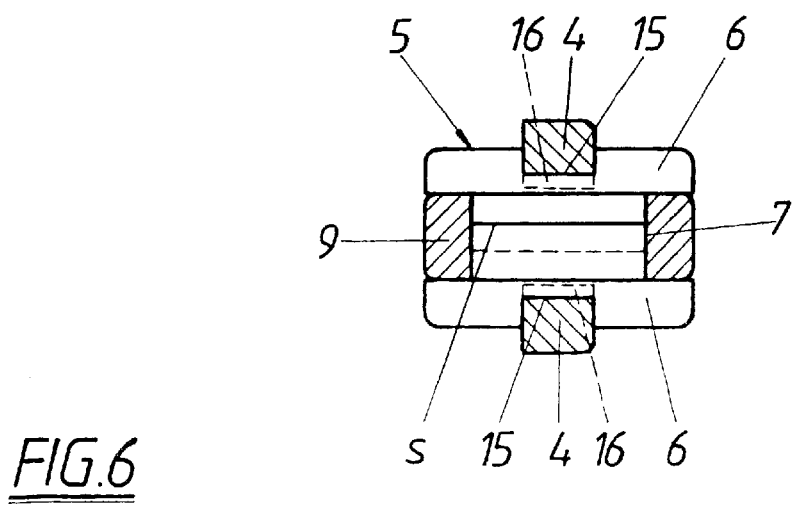
FIG. 6 shows a sectional view along line VI—VI of FIG. 4.

According to the embodiment of FIGS. 4 to 6, the end 2 of the side at the hinge end of a spectacle frame (not shown in closer detail) forms two legs 4 which are mutually connected at their end sides by a connecting bridge 14 and which receive between themselves a joint body 5 forming a circumferential groove 7 for receiving an eye 9 of a side jaw 8. In order to allow the joint body 5 to be inserted in the axial direction into the eye 9, which in the embodiment is closed off on the circumferential side, the joint body 5 is divided into two parts 6, with the graded abutting surfaces s engaging mutually and the two parts 6 being held together in a rotationally rigid way in the eye 9. In the engagement position of the two parts 6 as shown in the drawing, the receiving grooves 15 for the legs 4 extend on the mutually averted face sides of the two parts parallel with respect to one another. The joint body 5 can therefore be inserted together with the received eye 9 in such a way between the legs 4 that the legs 4 engage in the receiving grooves 15 of the joint body 5 and hold the same in a rotationally rigid way. The friction obtained between the joint body 5 and the eye 9 which engages in the circumferential groove 7 of the joint body 5 can again advantageously be used to define the run of the hinge, for which purpose a respective fit must be provided between the joint body 5, which is usually made of plastic, and the metallic eye 9.

For the purpose of inserting the joint body 5 into the end 2 of the side, the legs 4 are slightly spread apart, preferably within the scope of their own elasticity, in order to allow the insertion of the joint body 5 with the eye 9 transversally to the legs 4 between same until the legs 4 engage in the receiving grooves 15 of the joint body 5. Thereafter the joint body 5 with the eye 9 can be displaced against the connecting bridge 14 towards a latching recess 16 in the legs 4. When the joint body 5 latches into said latching recesses 16 the joint body 5 is fixed with respect to the end 2 of the side in a non-displaceable way, but still offering the possibility of easy disassembly. In said latched position of the joint body 5, the connecting bridge 14 forms between the legs 4 a stop for the stretched used position of the side, from which it can be swiveled in according to the arrow 17, as is shown in FIG. 5.

What is claimed is:

1. A hinge for spectacles with a joint body used as a hinge axle, which body forms a coaxial circumferential groove for receiving an eye of a side jaw and is rotationally rigidly held between two legs of an end of a side, which legs are connected to each other at least at one end and extend either side of the circumferential groove, characterized in that the joint body consists of two disk shaped parts having abutting surfaces extending transversally to the hinge axle in the zone of the circumferential groove, the parts of the joint body being provided at their averted face sides with parallel receiving grooves for the two legs of the end of the side.

2. A hinge as claimed in claim 1, characterized in that the joint body can latch into a latching recess of at least one of the least one of the legs of the end of the side.

3. A hinge as claimed in claim 1, characterized in that the two parts of the joint body interengage with stepped abutting surfaces.

4. A hinge as claimed in claim 1, characterized in that the legs of the end of the side are mutually connected on either side to form a receiving eye in which the joint body is held by a pin penetrating the same and that the two parts of the joint body are supported with respect to the receiving eye.

5. A hinge ac claimed in claim 4, characterized in that the pin which is provided with a self-cutting thread section can be merely screwed into the joint body but is held in a freely rotatable way in the end of the side with the ends of the pin which project on either side beyond the joint body.

* * * * *